Patented Feb. 1, 1944

2,340,745

UNITED STATES PATENT OFFICE 2,340,745

ISOMERIZATION OF RICINOLEIC COMPOUNDS

William E. Hanford, Richard S. Schreiber, and Hugh W. Gray, Wilmington, Del., assignors to E. I. du Pont de Nemours & Company, Wilmington, Del., a corporation of Delaware No Drawing. Application November 14, 1941, Serial No. 419,080

15 Claims. (Cl. 260—405.6)

This invention relates to the preparation of 12-ketostearic acid derivatives by catalytically isomerizing ricinoleic compounds.

Various methods have been utilized heretofore for preparing 12-ketostearic acid derivatives from castor oil. These include a two-step process which has found limited commercial use, namely, the catalytic hydrogenation of castor oil to 12-hydroxystearin, followed by catalytic dehydrogenation to 12-ketostearin. Alternatively, the 12-hydroxystearin can be oxidized by chemical means to 12-ketostearin using such reagents as chromic acid. Obviously such two-step procedures are deficient in numerous respects and would necessarily defer to a satisfactory one-step isomerization procedure, e. g., the direct rearrangement of castor oil to 12-ketostearin. Attempts at realizing this isomerization have not been particularly successful in a practical sense. Although 12-ketostearic acid derivatives have been identified in the pyrolysis products of the barium salts of castor oil acids, the yields are quite low and the presence of accompanying degradation products complicates the isolation procedures. Attempts at effecting isomerization by heating castor oil with hydrogenation catalysts have given inexplicable results. Thus, Belopolsky and Maksimov, Chem. Abs. 31, 7397 (1937), heated castor oil at 200° to 300° C. with a nickel catalyst prepared from nickel formate and obtained only traces of 12-ketostearic acid, the predominating reaction products being those resulting from dehydrogenation and pyrolysis.

This invention has as an object to provide a new and improved process for the production of 12-ketostearic acid derivatives from ricinoleic acid compounds. Another object is to prepare 12-ketostearic acid derivatives from castor oil by an efficient and commercially useful method. Other objects will be apparent from the following description of the invention.

The above and other objects appearing hereinafter are accomplished by the following invention which comprises heating the ricinoleic compound either with a nickel or cobalt catalyst prepared either by reducing a nickel or cobalt salt with sodium-naphthalene or by extracting with alkali the alkali soluble component of an alloy of nickel or cobalt with an alkali soluble metal, and, if the ricinoleic compound treated is not an ester of a lower monohydric alcohol, converting the isomerized product to such an ester by dissolving it in a lower monohydric alcohol, filtering off the nickel or cobalt catalyst, adding an ester interchange catalyst to the solution, heating it until substantially complete alcohol interchange has occurred, and recovering the ester by distillation or by other methods known to the art. If 12-ketostearic acid is the product desired it may be obtained from the lower monohydric alcohol 12-ketostearate by methods well known to the art.

In general, in practicing this invention with castor oil (80 to 85% triglyceride of ricinoleic acid), the castor oil is heated to between 225° C. and 300° C. for from 2 to 5 hours either with an elementary nickel or cobalt catalyst, prepared as hereinbefore described. The isomerized product is dissolved in an amount of a lower monohydric alcohol which is at least stoichiometrically equivalent to its 12-ketostearic acid content, the solution filtered to remove the nickel or cobalt catalyst, an ester interchange catalyst, e. g., concentrated sulfuric acid, is added, the solution refluxed until alcohol interchange is substantially complete, the glycerin removed by washing with water, an organic solvent, e. g., benzene, is added, the extract is dried and distilled under reduced pressure. Pure methyl 12-ketostearate boils at about 200° to 210° C. at 2 to 3 mm. pressure and melts at 42° to 44° C.

The reaction can be carried out at superatmospheric or at substantially atmospheric pressures, satisfactory yields being obtained when the reaction is carried out in an open vessel, there being very little apparent evolution of hydrogen. Similarly, when the reaction is carried out in a closed vessel the autogenous pressure developed is almost negligible.

Careful selection of the catalyst to be used is necessary for the successful practice of this invention. It has been found that elementary nickel catalysts comminuted at about 20° to 110° C. give uniformly high yields of 12-ketostearic acid derivatives.

The examples which follow are submitted to illustrate the preferred embodiments of this invention and are not to be considered as limitations thereof. Parts are by weight, unless otherwise stated.

Example I

A mixture of 100 parts of castor oil and 10 parts of a sodium-naphthalene-reduced nickel catalyst prepared according to U. S. 2,177,412, is placed in a glass reaction vessel fitted with a stirrer, air condenser and gas-collecting bottle. The reaction mixture is heated for 6 hours at 230° to 250° C. with stirring, the viscous liquid is cooled to room temperature, and the catalyst removed by filtration. From the reaction mixture there is separated a white crystalline product melting at 79° to 81° C. and identified as 12-ketostearin.

Example II

A mixture of 50 parts of methyl ricinoleate and 5 parts of the sodium-naphthalene-reduced nickel catalyst of Example I is heated in a closed metal reaction vessel at 250° C. for 1 hour with vigorous agitation. The reaction mixture is dissolved in methanol, the catalyst removed by filtration and the methanol solvent evaporated. The resulting semi-crystalline solid is washed with low-boiling petroleum ether. The material melts at 43° to 46° C. and does not depress the melting point of authentic methyl 12-ketostearate. The ketone number is 160.9, the theoretical value for methyl 12-ketostearate being 180.

*Example III*

A mixture of 100 parts of castor oil and 10 parts of the sodium-naphthalene-reduced nickel catalyst of Example I is heated in a closed metal reaction vessel at 250° C. for 1 hour. The reaction mixture is allowed to cool to room temperature, dissolved in 160 parts of methanol, and filtered to remove the catalyst. After addition of 9 parts of concentrated sulfuric acid the solution is refluxed for 5 hours. The mixture is washed with water, dissolved in benzene, dried over sodium sulfate, and distilled under reduced pressure. There is obtained 43 parts of methyl 12-ketostearate boiling at 183° to 199° C. (2.8 to 4.0 mm., M. P. 42° to 46.5° C.).

*Example IV*

A mixture of 100 parts of castor oil and 10 parts of alloy-skeleton nickel catalyst is heated in a closed metal reaction vessel for 3 hours at 275° C. The reaction mixture is dissolved in 160 parts of methanol, filtered free of catalyst, and refluxed for 5 hours with 18 parts of concentrated sulfuric acid. The material is washed with water, dried, and distilled. There is obtained 54 parts of methyl 12-ketostearate boiling at 180 to 202° C. (2.7 to 4.0 mm., M. P. 41° to 44° C.).

The alloy skeleton nickel catalyst of the above example is prepared as follows:

Four hundred fifty four parts of a 50/50 nickel-aluminum alloy powder is added in small portions to 2454 parts of an approximately 18% aqueous sodium hydroxide solution and the suspension heated for 4 hours. The suspended material is allowed to settle and the supernatant caustic containing liquid removed by decantation. The finely divided metallic nickel is washed with water until the washings are neutral to litmus, the finely divided nickel powder is washed with alcohol until free of water, and stored in alcohol.

*Example V*

A mixture of 100 parts of castor oil and 10 parts of the sodium-naphthalene-reduced nickel catalyst of Example I is placed in a glass reaction vessel fitted with a gas exit tube open to the atmosphere. The reaction mixture is heated with stirring for 4½ hours at 230° to 275° C. The reaction mixture is filtered and after conversion of the glyceride to the methyl ester by refluxing with methanol in the presence of sulfuric acid there is obtained 62 parts of methyl 12-ketostearate boiling at 182° to 205° C. (5 mm., M. P. 42° to 45° C.).

*Example VI*

Passage of castor oil over pellets of the sodium-naphthalene-reduced nickel catalyst of Example I in a reaction chamber maintained at 270° to 285° C. results in conversion to a crude product from which methyl 12-ketostearate is isolated as described in Example V.

*Example VII*

A mixture of 100 parts of castor oil, 100 parts of cyclohexene and 10 parts of the sodium-naphthalene reduced nickel catalyst of Example I is heated in a closed metal reaction vessel at 275° C. for 3 hours. The crude product is converted to the methyl ester and there is obtained 53 parts of methyl 12-ketostearate boiling at 190° to 204° C. (3.0 to 3.5 mm.).

Ricinoleic compounds are generally suitable for the practice of this invention. In place of commercial castor oil, which contains from 80 to 85% glyceryl triricinoleate, there can be used either castor oil purified by extraction with petroleum naphtha, or such ricinoleic compounds as methyl, ethyl, propyl, octyl, dodecyl, etc., ricinoleates, ricinoleamide, ricinoleic anhydride, and salts of ricinoleic acid, e. g., sodium, potassium and ammonium ricinoleates, etc.

In the practice of this invention there can be used elementary nickel or cobalt catalysts comminuted at temperatures of about 20° to about 110° C. One of the preferred catalysts is alloy-skeleton nickel prepared by caustic extraction of nickel-aluminum alloys at temperatures of about 90° to 100° C. Another preferred catalyst is nickel prepared by the sodium-naphthalene reduction of nickel chloride according to U. S. Patent 2,177,412. The catalysts can be used in the finely divided state or in massive form, e. g., pellets. The catalyst can be of the pyrophoric type or may be stabilized by subjection of the pyrophoric metal to an oxygen containing atmosphere at a temperature below 50° C. It has been found that traces of alkali in the catalyst are beneficial since the activity of the catalyst is thereby enhanced. This activating effect of alkali can be utilized to render operable catalysts which are otherwise relatively inactive in the isomerization of ricinoleic compounds to the corresponding ketostearic compounds. By traces of alkali it is meant amounts of alkali insufficient to bring about any substantial hydrolysis or dehydration of the ricinoleic acid ester under the conditions of reaction.

If desired, the ricinoleic compound can be isomerized in solution in a suitable organic solvent, e. g., benzene, acetone, cyclohexane, decahydronaphthalene, etc.

The process of this invention can be operated over a considerable range of temperatures. Reaction occurs at temperatures as low as 200° C. As the temperature is raised the rate of reaction increases and it is therefore preferable to operate at temperatures above 200° C. In most cases the compounds are stable at temperatures up to 350° C. and the process can be operated at temperatures in the range of 200° to 350° C. In general the process is carried out in a closed reaction vessel under the autogenous pressure of the reaction mixture. If desired, however, the process can be operated under superatmospheric pressures developed by the introduction of inert gases such as nitrogen or carbon dioxide. The reaction also proceeds satisfactorily when run in an open vessel at atmospheric pressure. It is desirable, though not necessary, to blanket the mixture with an inert atmosphere, such as nitrogen or carbon dioxide to avoid any deleterious effects due to oxygen at the high temperatures employed. The reaction is also adaptable to continuous operation by passing the ricinoleate over the nickel or cobalt catalyst maintained at the proper temperature.

As mentioned above the ketostearic acid derivatives obtained can be isolated by various methods, e. g., distillation of the ester, crystallization of the free acid, ester, salt, anhydride or amide, etc.

The process of this invention is useful in the preparation of 12-ketostearic acid and its derivatives which are valuable intermediates in the preparation of surface-active materials, pharmaceuticals and bifunctional polymer ingredients, and in the formulation and compounding of waxes and similar materials.

As many apparently widely different embodiments of this invention may be made without departing from the spirit and scope thereof; it is to be understood that this invention is not to be limited to the specific embodiments shown and described.

We claim:

1. A process for catalytically isomerizing a ricinoleic compound to 12-ketostearic acid derivatives which comprises heating said ricinoleic compound in the presence only of a catalyst selected from the group consisting of elementary cobalt and nickel, said catalyst being prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali.

2. The process in accordance with claim 1 characterized in that the catalyst is in the pyrophoric condition.

3. The process in accordance with claim 1 characterized in that the catalyst is one prepared by stabilizing the pyrophoric metal by exposure to an oxygen-containing atmosphere while maintaining the catalyst mass at a temperature below 50° C.

4. A process for catalytically isomerizing a ricinoleic compound to 12-ketostearin which comprises heating castor oil at a temperature between 200° and 350° C. in the presence only of a catalyst selected from the class consisting of elementary cobalt and nickel, prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali.

5. The process in accordance with claim 1 characterized in that the catalyst is selected from the class of alloy-skeleton nickel and cobalt catalysts.

6. The process in accordance with claim 1 characterized in that the catalyst is one prepared by reducing a salt of a metal selected from the class of nickel and cobalt with sodium-naphthalene.

7. A process for catalytically isomerizing a ricinoleic compound to ketostearic acid derivatives which comprises heating said ricinoleic compound in the presence only of an alloy skeleton nickel catalyst prepared by the caustic extraction of finely divided nickel-aluminum alloy at temperatures of about 90° to 100° C.

8. A process for catalytically isomerizing a ricinoleic compound to ketostearic acid derivatives which comprises heating said ricinoleic compound in the presence only of a nickel catalyst prepared by the sodium-naphthalene reduction of nickel chloride.

9. A process for catalytically isomerizing a ricinoleic compound to 12-ketostearic acid derivatives which comprises heating castor oil in the presence only of a catalyst selected from the class of elementary nickel and cobalt catalysts prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali, heating the resulting 12-ketostearin with a monohydric alcohol in the presence of an alcohol interchange catalyst, and separating the resulting monohydric alcohol 12-ketostearate.

10. A process for catalytically isomerizing a ricinoleic compound to 12-ketostearic acid which comprises heating castor oil in the presence only of a catalyst selected from the class of elementary nickel and cobalt catalysts prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali, heating the resulting 12-ketostearin with a monohydric alcohol in the presence of an alcohol interchange catalyst, separating the resulting monohydric alcohol 12-ketostearate, hydrolyzing the latter compound, and recovering the resulting 12-ketostearic acid.

11. A process for catalytic isomerization monohydric alcohol 12-ketostearate which comprises heating a monohydric alcohol ester of ricinoleic acid in the presence only of a catalyst selected from the class of elementary nickel and cobalt catalysts prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali, and isolating the resulting monohydric alcohol 12-ketostearate.

12. A process for catalytic isomerization 12-ketostearic acid which comprises heating a monohydric alcohol ester of ricinoleic acid in the presence only of a catalyst selected from the class of elementary nickel and cobalt catalysts prepared by reacting a salt selected from the group of nickel and cobalt salts with a solution of sodium-naphthalene and elementary cobalt and nickel prepared by treating an alloy selected from the group of cobalt-aluminum and nickel-aluminum alloys with a solution of caustic alkali, removing the catalyst, hydrolyzing the monohydric alcohol 12-ketostearate, and recovering the 12-ketostearic acid.

13. The process in accordance with claim 1 characterized in that the nickel catalyst contains traces of alkali.

14. The process in accordance with claim 7 characterized in that the catalyst contains traces of alkali.

15. The process in accordance with claim 8 characterized in that the catalyst contains traces of alkali.

WILLIAM E. HANFORD.
RICHARD S. SCHREIBER.
HUGH W. GRAY.